United States Patent [19]
Perlo et al.

[11] Patent Number: 5,818,627
[45] Date of Patent: Oct. 6, 1998

[54] DEVICES WITH MICRO-MIRRORS AND MICRO-FILTERS FOR SELECTING COLORS AND IMAGES

[75] Inventors: Piero Perlo, Sommariva Bosco; Piermario Repetto, Turin; Sabino Sinesi, Piossasco; Luca Sardi, Sant' Ambrogio, all of Italy

[73] Assignee: C.R.F. Societa' Consortile per Azioni, Torino, Italy

[21] Appl. No.: 788,704

[22] Filed: Jan. 24, 1997

[30] Foreign Application Priority Data

Jan. 24, 1996 [IT] Italy ................................ T096A0037

[51] Int. Cl.⁶ ............................................... G02B 26/00
[52] U.S. Cl. ........................ 359/292; 359/559; 359/619
[58] Field of Search .................... 359/292, 298, 359/315, 316, 558, 559, 566, 567, 572, 573, 576, 556, 619, 621

[56] References Cited

U.S. PATENT DOCUMENTS

| | | | |
|---|---|---|---|
| 3,330,908 | 7/1967 | Good et al. | 359/292 |
| 3,345,462 | 10/1967 | Good et al. | 359/292 |
| 3,479,512 | 11/1969 | Weissenberg | 359/292 |
| 3,592,529 | 7/1971 | Juhlin, Jr. | 359/292 |
| 3,912,386 | 10/1975 | Gorog et al. | 359/292 |

*Primary Examiner*—Loha Ben
*Attorney, Agent, or Firm*—Sughrue, Mion, Zinn, Macpeak & Seas, PLLC

[57] ABSTRACT

The polychromatic or monochromatic radiation beam emitted by a light source strikes an array of micro-filters which partially or totally transmit the light beam towards an array of micro-mirrors. The partially reflected beam comes back towards the first array of micro-filters and passes again through it until it reaches a viewer or a recording system or a screen. A relative movement between the two arrays of micro-filters and micro-mirrors enables static or animated images or colour strips selectable according to the needs to be generated.

15 Claims, 6 Drawing Sheets

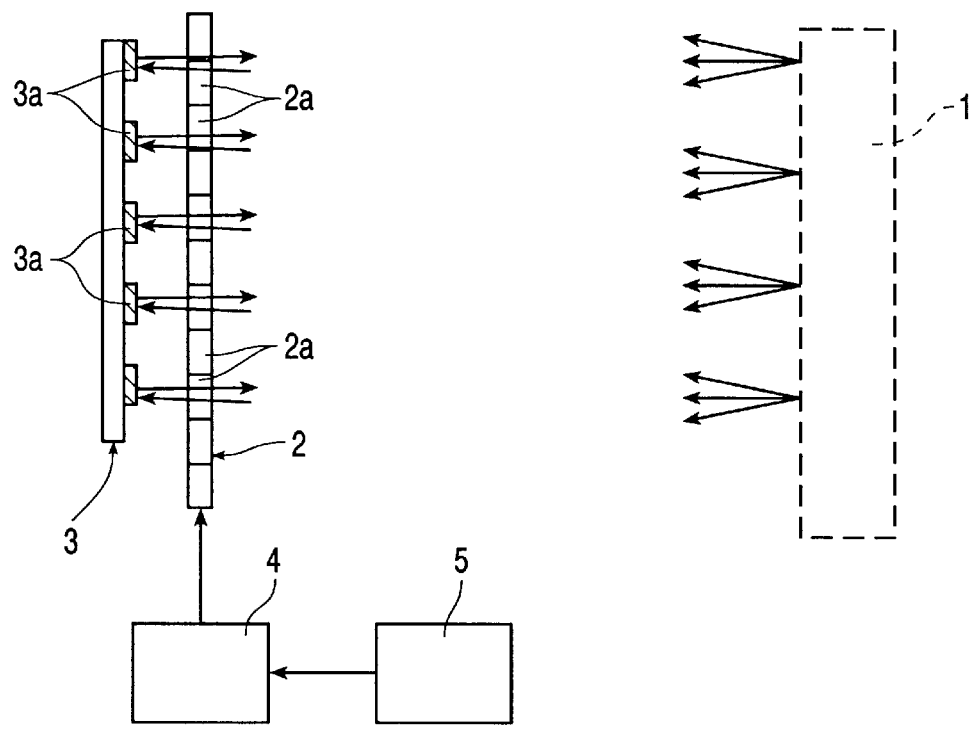
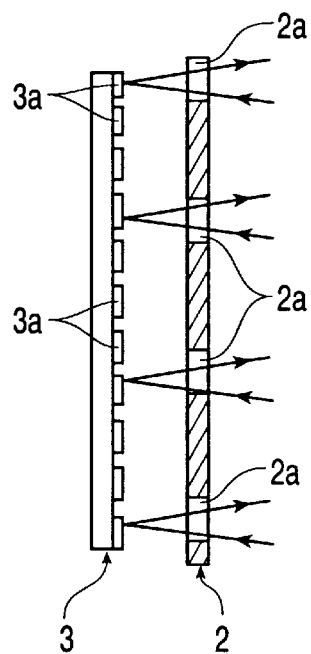
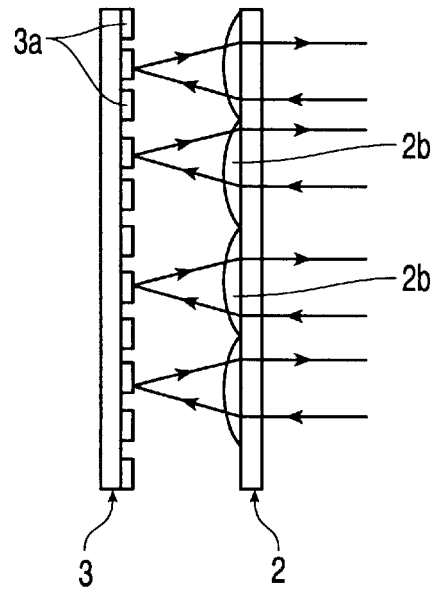
Fig. 3
Fig. 4a
Fig. 4b

DEVICES WITH MICRO-MIRRORS AND MICRO-FILTERS FOR SELECTING COLORS AND IMAGES

BACKGROUND OF THE INVENTION

The present invention relates to the field of optical devices which can be used for selecting colours or images in a polychromatic light beam.

The colour selection in a polychromatic light beam has been always the subject of study by optics experts. The most known method lies in placing coloured filters on the path of the light beam. To this end, the filters are usually carried on a rotating disk A (FIGS. 1A, 1B) driven by an electric motor B and including a plurality of sectors $C_1$, $C_2$, $C_3$, . . . $C_n$ constituted by filters of different colours. In another known solution, the colour is selected by using a liquid crystal system C controlled by an electronic control device D. This type of colours selection is efficient, does not require moving parts and can be applied, as also in the case of FIGS. 1A, 1B, both in displaying and in projecting images. The solution of FIG. 2, however, implies the use of expensive materials, which are not so much available on the market, a sophisticated control electronics and finally it requires high investments for an industrial exploitation.

In the field of devices for displaying images or static signals, the conventional technique usually consists in illuminating uniformly a symbol placed with various means on a transparent plate. In this manner, in order to display different signals, it is necessary to provide a symbol for each type of signal. Thus, for example, the warning lights on a dashboard of a motor-vehicle require the provision of a light source for each symbol.

In the field of devices for displaying dynamic images, matrices of cells are used, each of which may change its state, for example by means of liquid crystals, and polarizing filters or micro-mirrors. In all cases which make use of liquid crystals, diffusers and polarizing filters, there is the problem that a narrow observation window can not be defined. This aspect is sometimes advantageous, since it enables observation even at great angles, but on many other occasions it is indeed disadvantageous, since the images are visible also from positions from which they should not be visible.

In the field of projection of static images, according to the prior art, a diapositive is uniformly lighted by a polychromatic beam and an objective projects the image on a screen. Each time that one wishes to change the image, it is necessary to replace the diapositive.

SUMMARY OF THE INVENTION

The object of the present invention is that of overcoming the problems of the prior art which has been described above with relatively simple means and by using conventional materials and low costs technologies.

In view of achieving this object, the invention a device for selecting colours or images in a light beam including a light beam generator, an array of micro-lenses acting as micro-filters integrated in a transparent thin plate for generating a plurality of partial beams, an array of micro-mirrors for reflecting a plurality of images, each micro-mirror having a size and a cross-section adapted to the size and the cross-section of said micro-lenses and an actuating device to cause a relative movement between the two arrays of micro-lenses and micro-mirrors so as to obtain an output luminous pattern, selected among various possible patterns which are different in shape and/or colour and or divergency.

BRIEF DESCRIPTION OF THE DRAWINGS

The invention will be now described with reference to the annexed drawing, given purely by way of non limiting example, in which:

FIG. 3 shows a first embodiment of a device according to the invention, comprising a matrix of a micro-mirrors on a base which absorbs the incident radiation and a matrix of coloured filters wherein the number of coloured filters is greater than the number of micro-mirrors, FIG. 4a shows a further embodiment comprising a matrix of coloured micro-mirrors coupled with a matrix of transparent micro-cells on a substrate of glass or rigid plastics or with a duel film, FIG. 4b shows a variant comprising a matrix of micro-lenses and a matrix of micro-mirrors wherein the number of micro-mirrors is greater than the number of micro-lenses.

DETAILED DESCRIPTION OF THE INVENTION

Figure 1A:
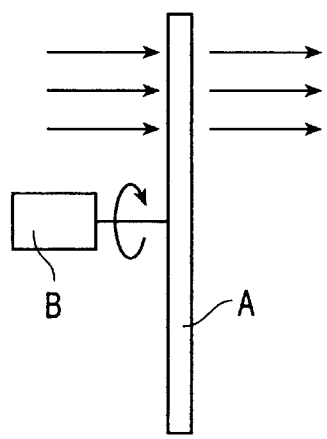
FIG. 1A is a side view of a device for selecting colours by a rotating coloured filter, according to the prior art.
Figure 1B:
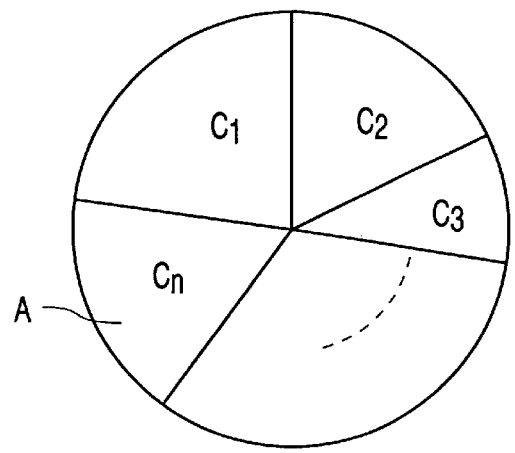
FIG. 1B is a front view of the device of FIG. 1A, FIG. 2 diagrammatically shows a device for selecting colours by means of liquid crystals, according to the prior art.
Figure 2:
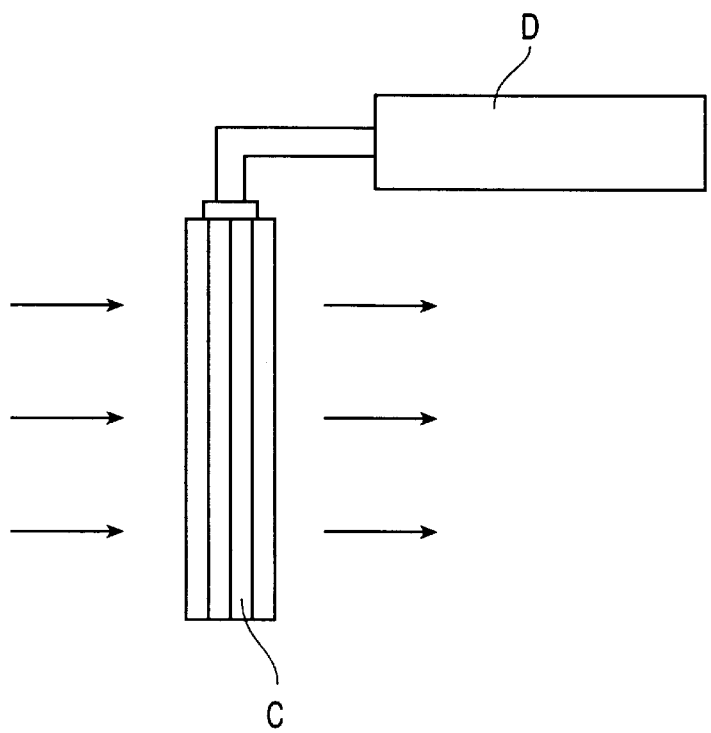

With reference to FIG. 3, a polychromatic light beam emitted by a light source 1, which can be artificial or natural, punctiform or extended, intercepts and passes through a matrix of micro-filters 2a. The transmitted beam is reflected by a matrix 3 of micro-mirrors 3a and passes again through matrix 2 of micro-filters 2a. A relative movement between the two matrices 2, 3 of micro-filters and micro-mirrors, applied by an actuating device 4 of any known type, driven by an electronic control unit 5, enables the selection of an image or a colour among those recorded on micro-filters 2a. The rays which do not intercept the micro-mirrors 3a are absorbed and an observer will see in this manner only the colour or the monochromatic or polychromatic image recorded on the micro-filters 2a corresponding to the micro-mirrors 3a.

In its simplest configuration, shown in FIG. 3, each micro-mirror 3a has the size of a micro-filter 2a. In this manner, only the micro-filter 2a located in front of each micro-mirror 3a can be seen by an observer staying on the side of matrix 2 of micro-filters 2a. The light which passes through the other filters is indeed absorbed by cells adjacent to the micro-mirrors 3a.

In the case that the micro-mirrors 3a are coloured, a solution can be adopted of a matrix of transparent cells in a dull layer, as shown in FIG. 4a. In this case, only the rays transmitted by the transparent cells 2a are reflected.

FIG. 4b shows a more efficient configuration, in which the matrix of micro-filters is replaced by a matrix 2 of a micro-lenses 2b which select the images recorded on the matrix of the micro-mirrors 3a. The focalization provided by the micro-lenses enables the manufacture of devices in which on the matrix of micro-mirrors there is recorded a high number of images. The mirrors can be coloured with known techniques. Obviously, devices can be used which have combinations of matrices of coloured micro-mirrors and coloured micro-filters has shown in FIGS. 3 and 4, respectively.

More generally, the size, the curvature and the shape of the micro-mirrors 3a are defined by the curvature and the size of micro-filters 2a as well as by the distance between the two matrices.

Figure 5A:
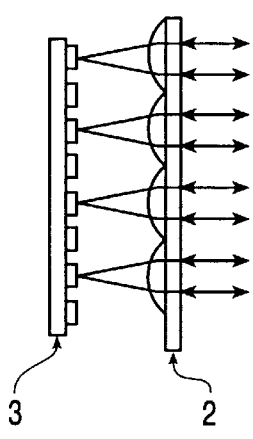
FIGS. 5a, 5b, 5c show three further variant of the invention in which the micro-mirrors and/or the micro-filters are given a curvature.

The micro-mirrors 2a can be placed on the first interface (FIG. 5a) or on the second interface (FIG. 5c) of the plate on which they are supported. Similarly, the curvature of micro-lenses 2b can be varied from one element to the other, and these micro-lenses 2b can be positioned on one or the other side of the plate on which they are supported. The choice of the best solution depends from the technology used for the two matrices and is further affected by the resolution requested in the specific application.

The matrices of micro-lenses 2b can be of refractive or diffractive type, with a continuous or multi-level profile, or of diffractive-refractive hybrid type, or with a radio variation of the refraction index or of any other type. The matrices of micro-mirrors 3a can be obtained by a silk screen process, or with known thin film procedures or by etching procedures applied on a reflecting layer previously deposited on the substrate surface. Both matrices of micro-filters and micro-mirrors 2, 3 can be obtained on a flexible film, for example of polymeric type, for example polyester, subsequently glued to a more rigid substrate. The matrices of micro-filters 2a can be printed with pressure or injection-compression techniques, or by embossing lamination, silk-screen process or generated with other techniques known in the field of generation of micro-optics. The coloration of the single cell (pixel) or the single micro-mirror or matrix 3 which operates in reflection can be obtained with a thin layer of coloured paste with a high reflectivity or by means of diffraction gratings generated on the reflective layer.

In the solution shown in FIG. 3, the images are recorded on the matrix of micro-filters (equivalent to a diapositive on which many images are superimposed). The selected image is that whose pixels (cells) 2a are aligned with the axes of micro-mirrors 3a. The single micro-mirror 3a can be given a curvature to increase the lighting efficiency of the cooperating cell. The number of images which can be recorded on the matrix of micro-filters (multi-diapositive) depends from the technological capabilities, whereas the number of cells which form the single image is defined by the number of the micro-mirrors.

In the solution described in FIG. 4b, the number of distinct images which can be recorded in the matrix of micro-mirrors 3a depends from the technological capabilities of generating the smallest possible cell. The number of cells which form a single image is instead defined by a number of micro-lenses of the matrix which operates in transmission.

By taking the specific case of the configuration shown in FIG. 3 (also FIG. 4b could be considered in a similar way) in case of a matrix of K×M micro-mirrors, this matrix can be designated by $A_{K,M}$ and the single micro-mirror can be identified with $a_{ij}$, where i=1, 2, ... K and j=1, 2, ... M. If the micro-mirrors 3a are all identical, for example rectangular with sides L×H and the matrix of micro-filters 2 is constituted by rectangular elements of L×H sides, supposing that for each micro-mirror there are N×S micro-filters, the single micro-filter in the matrix of micro-filters can be designated by the term $(f_{a,\ b})_{ij}$ where i, j indicate the corresponding micro-mirror, and a=1, 2, ... N; b=1, 2, ... S. For each micro-mirror there are N×S micro-filters. The type of micro-filter which intercepts the micro-mirror can be selected with one of the N×S possible positions. A number of N×S small light beams are transmitted by the micro-filters, and of these small beams only a number K×M intercepts the micro-mirrors which reflect them backwardly towards the micro-filters. If the micro-filters having identical indexes a, b are all identical, than for each position there corresponds a colour of the light beam. Viceversa multi-colour beams or coloured images constituted by K×M cells (pixels) can be generated. In this case, the N×S possible images can be used to generate animated effects.

A generalization of the above discussion is the use of an optical element on which filters or images are recorded according to gradual variations rather than in discrete or digital form. More generally, if the micro-mirror has a non rectangular cross-section, the micro-filters have corresponding shape and size. The distance between micro-filters and micro-mirrors is kept small in such a way that the small beam transmitted by a single cell of the matrix of micro-filters, once it is reflected, can not intercept further cells, also considering the non collimation of the polychromatic beam incident on the micro-filters. The micro-filters and the micro-mirrors themselves can be provided with focal power in this regard.

Figure 6A:
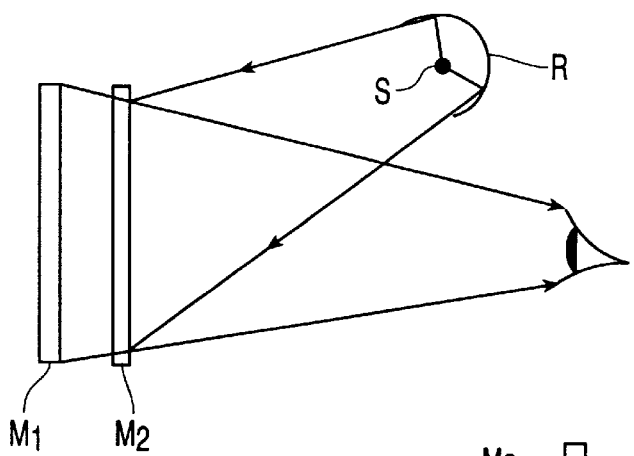
FIG. 6a, 6b, 6c show examples of configurations for illuminating the device.
Figure 6B:
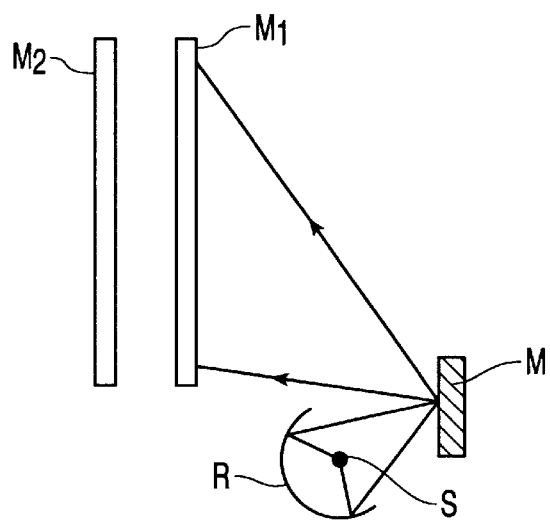

The polychromatic light beam shown in FIG. 3 can be generated by a discharged source, or a neon, or incandescence, semi-conductor, solid-state, polymeric, fluorescence or gas source. The beam can be further partially or totally corrected in its vergency by an optical system which operates with free propagation or with a wave-guide exploiting reflection phenomena or according to known systems which operate in refraction, total inner-reflection, diffraction or combinations thereof. Typical solutions are shown in FIGS. 6a,b. In the device shown in FIG. 6a, the illumination of matrices M1, M2 is obtained by inserting the source in a reflector. In the device of FIG. 6b, the lighting beam is bent by a mirror M. The planar-curved mirror can be provided with a diffraction grating which contributes to the colour selection.

Figure 6C:
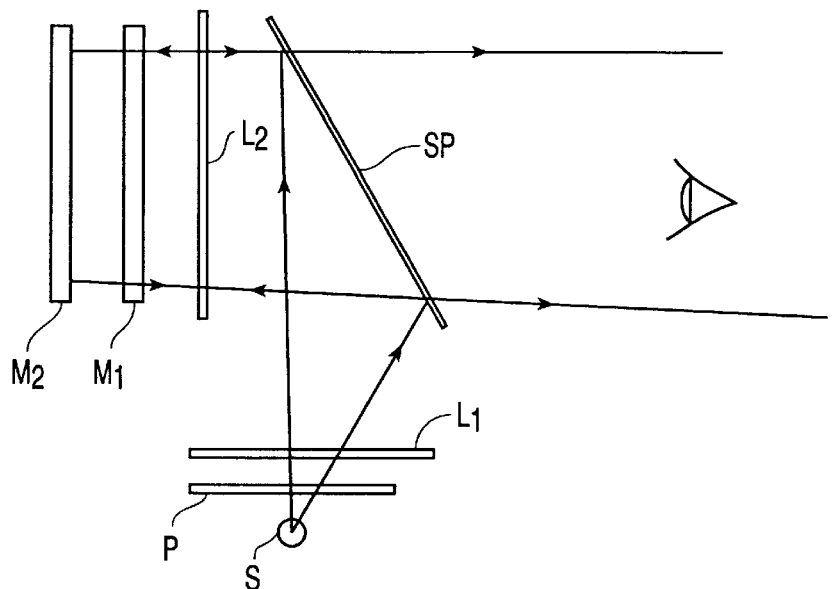
Figure 7:
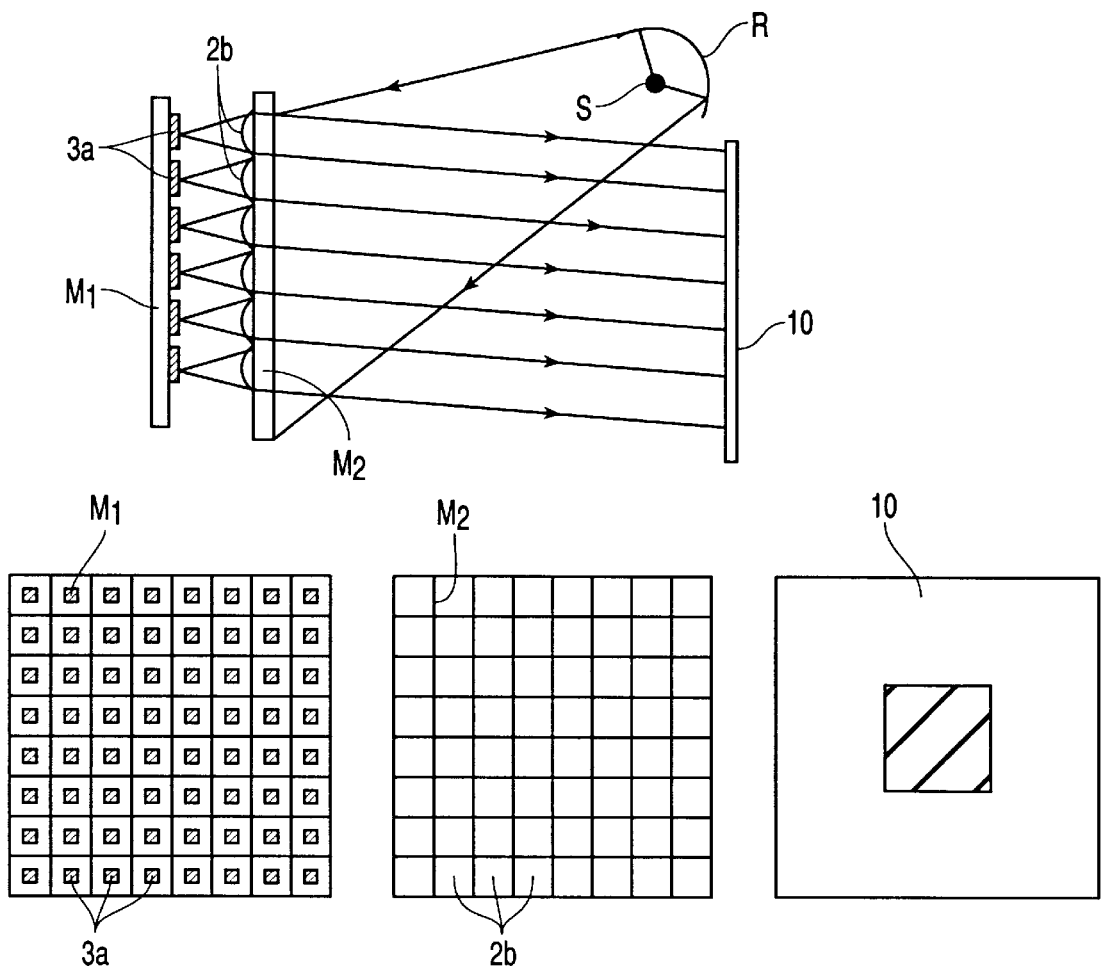
FIG. 7 shows an example of application of the invention in which the projected pattern is defined by the cross-section of each lens in the matrix of the micro-lenses.

Polarizing optical elements can be used to bend the light beam as shown in FIG. 6c. In this figure, S designates the source, M1 and M2 designate the two micro-mirrors and micro-filters matrices, respectively, P designates a polarizer, L1, L2 designate delaying leaves and SP designates a polarizing semi-mirror. The small distance between the two matrices enables the devices to operate also with natural light. In the devices with a configuration of the type shown in FIG. 4b, the matrix 2 of micro-lenses 2b can be constituted by refractive, diffractive, diffractive-refractive hybrid lenses, or with radial variation or volume variation of the refraction index. The base material of the micro-lens matrix can be plastics or glass and provided with anti-reflective coatings of the thin film type or diffractive type in order to improve the efficiency of the transfer of the light beam. The single micro-lens can have a rhomboidal, hexagonal, rectangular or square cross-section, with the phase function of a spherical lens or more generally such that alone or in combination with the cooperating micro-mirror, for diffractive or combined diffractive-refractive effects, beams can be generated with controlled divergency and lights distribution. An example is shown in FIG. 7. The polychromatic beam is collimated in passing twice on matrix $M_2$ of micro-lenses 2b with rectangular cross-section and is distributed on a screen 10 with a rectangular cross-section, with a high uniformity in the intensity distribution. The coloured micro-mirrors 2a of matrix $M_1$ can select the colour of the single projected cell. The relative distance between the two matrices $M_1$, $M_2$ defines the divergency of the beam coming out of the device.

Figure 8:
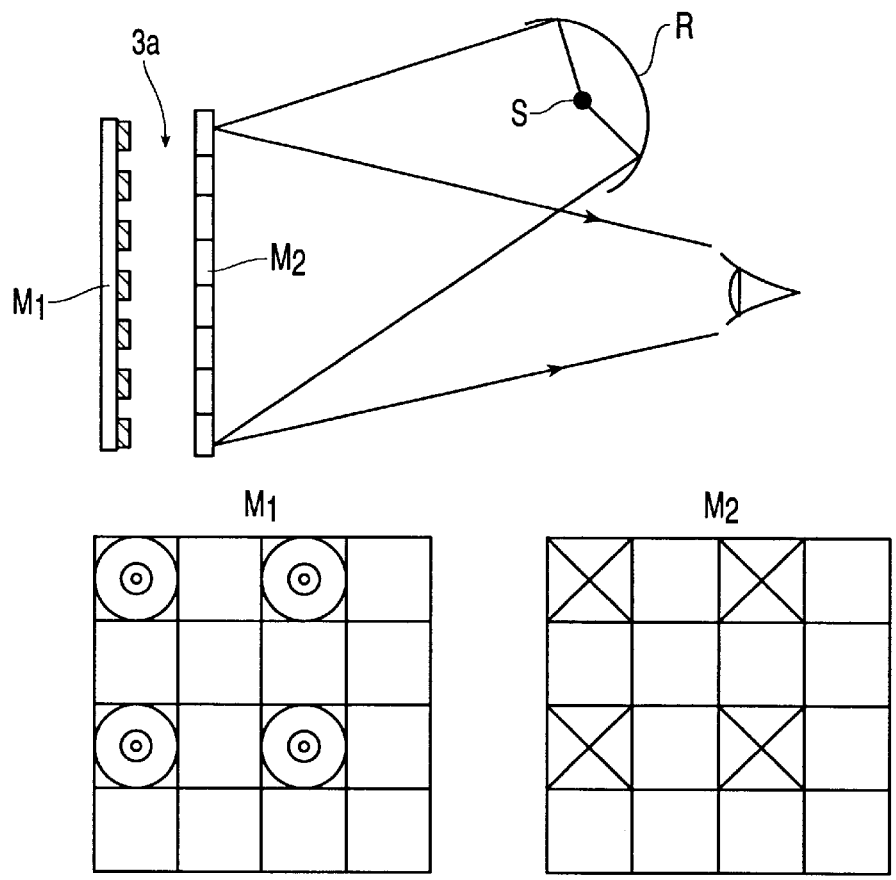
FIG. 8 shows a further example of application of the invention in which the micro-mirrors are made in diffractive form, with spherical lenses having a rectangular cross-section which contribute to define the shape of the projected beam.
Figure 9:
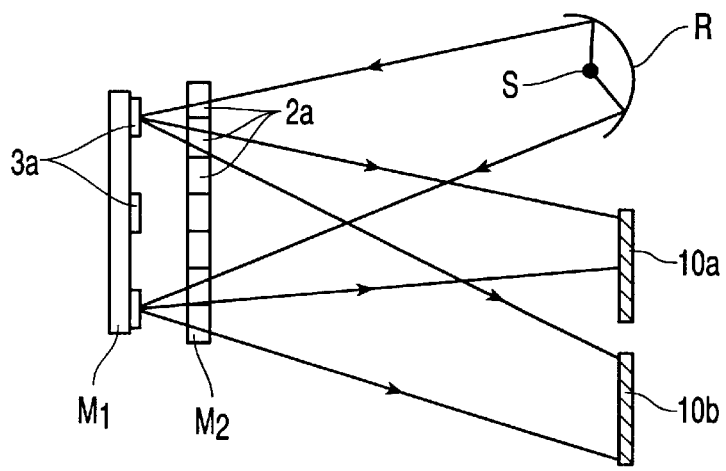
FIG. 9 shows a further example of application of the invention in which the micro-mirrors are constituted by a diffraction net which divides the incident beam into a plurality of beams, FIG. 10 yet shows a further example of the application of the invention which relates to an advertising panel constituted by many independent base modules.

In the device of FIG. 8, the matrix of micro-filter $M_2$ only selects the colour of the beams reflected by matrix $M_1$ of diffractive micro-mirrors 3a with rectangular cross-section. A viewer sees the image selected and diffused in the matrix of micro-filters. By the same system, if the micro-filters diffuse light to a limited extend, the beam projected on the screen has a structure with uniformity and cross-section determined by the type of micro-mirrors which are used. In the device of FIG. 9, micro-mirrors 3a have a diffraction grating which device the incident small light beam into separate beams. The light patterns coming out of the device can be thus projected along direction which are defined by a computation. Similarly viewing angular windows may be defined.

Figure 10:
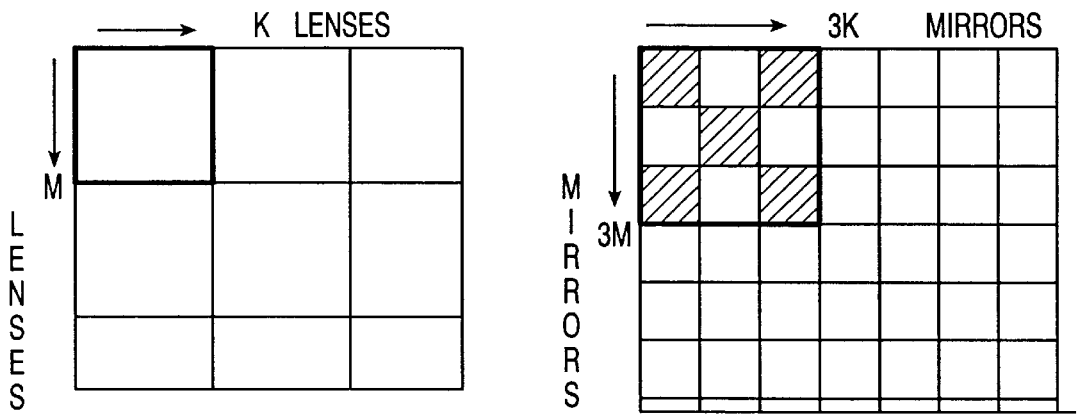

In FIG. 10 there is shown a system for displaying 9 static images. A matrix of M×H micro-lenses with a square shape of L size is followed by a matrix of micro-mirrors of square shape and L/3 sides. The area of each micro-lens cooperates with 9 micro-mirrors having different of partially identical colours. On the micro-mirrors there are recorded 9 images each composed of M×K cells (pixels). The colours of the pixels may be all identical, to generate monochromatic images, or may have any colour to generate polychromatic images. The desired image is selected by causing a relative movement between micro-mirrors and micro-lenses. The animation effect may be easily generated by selecting in sequence images which are slidly different from each other, according to methods known in the field of cartoons.

In general, in devices of this kind, if the coloured micro-filters are also diffusers, the images are clearly visible even when looking at the plane of the micro-filters from a great incidence angle. Viceversa, if the micro-filters transmit the beams without diffusing light, the visibility angle of the images on the plane of the coloured micro-filters is defined by the numeric aperture of the micro-lenses. This latter case is particularly interesting each time that one wishes to limit the viewing angle. Examples are the traffic signals and information lights on board a vehicle.

In all the application examples shown above, the micro-filters and the micro-mirrors may be arranged according to line matrices as shown for example in FIGS. 7 and 8, or may be arranged along circles or spirals or yet in any other arrangement which enables the type of light beam or image coming out of the combination of micro-filters and micro-mirrors to be selected by causing a linear movement, a rotation, an inclination or a combination thereof between micro-filters and micro-mirrors.

The relative movement between the two matrices may be applied mechanically, electro-mechanically, by piezo-electric or polymeric actuators or the like, at choice, by rapidly activating and deactivating the filters of the primary colours with different time periods which may fool the eye-brain system thus giving the impression that a colour is active which in fact is not included among the filters. As a matter of fact, by acting on the own time period $t_i$ of the single primary colour, the colour perceived may be selected by applying concepts which are known in colorimetry and photometry. As a first approximation, the colour perceived may be expressed by the sum $Rt_1+Jt_2+Bt_3$, where R, J, B are the primary colours and $T_i$ is the exposure time of the colour.

Figure 5B:
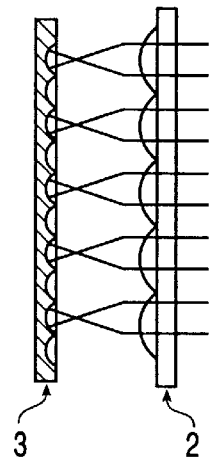
Figure 5C:
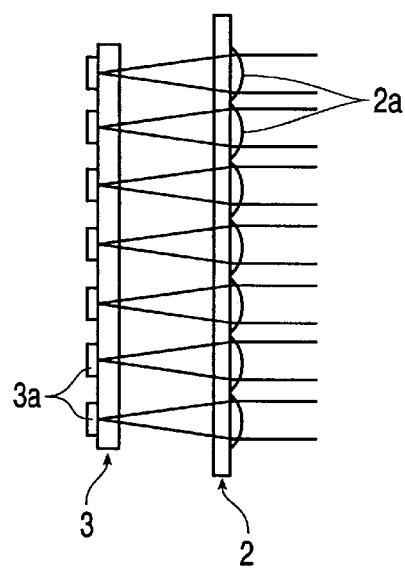

In a device of big size such as an advertising panel or a luminous sign in which the messages may be varied with respect to image, colours, and directions, a plurality of independent base devices such as those described in FIGS. 3, 4, 5 may be used.

Figure 11:
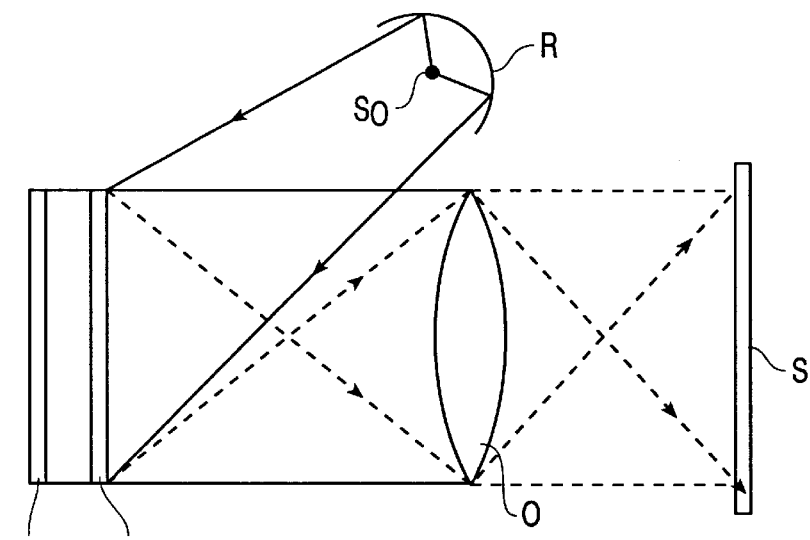
FIG. 11 shows an application of the invention to a device for projecting images, with particular reference to a multi-image diapositive projected through the objective.

In FIG. 11 there is shown a device for projecting images or luminous patterns having a predefined cross-section. An objective O has the function to project the luminous pattern coming out of the micro-filters of matrix $M_1$ on a screen S. In the most general case, the device operates as a modified diapositive projector, in which a matrix of micro-lenses has been inserted and the diapositive (or matrix of micro-filters $M_1$) has recorded on the whole size of the diapositive a plurality of images which can be selected by causing a relative movement between micro-filters and micro-mirrors. The latter may be inclined with respect to the main plane of the substrate on which they are supported in order to better collect the light beam which reaches the objective.

Figure 12:
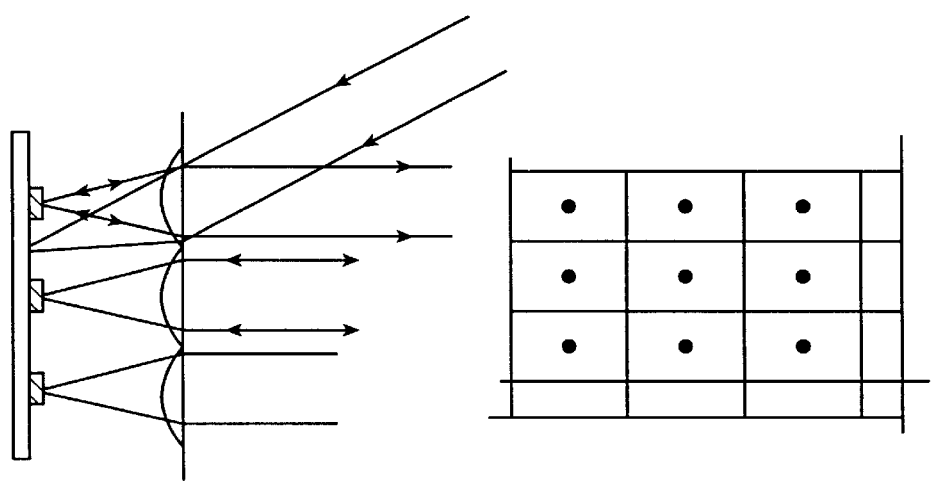
FIG. 12 shows a further variant.

In general, the micro-mirror matrix $M_2$ may operate as a matrix of space or Fourier-type filters: the micro-mirrors operate as space filters, since they are constituted by reflecting apertures having a predetermined size and shape, arranged in the vicinity of the focal plane of the micro-lenses. The apertures arranged near the focus of the micro-lenses have the function to select the portion of the light beam which is undesired for intensity or in frequence. In fact, the rays incident on the micro-lenses beyond a given predetermined angle are reflected or absorbed or attenuated or more generally substantially filtered by the reflecting apertures. The introduction of spatial filters contributes in this way to the definition of the intensity, clearness and directionality of the luminous pattern coming out of the device (see FIG. 12).

From the foregoing description it is clearly apparent that in the device according to the invention the polychromatic or monochromatic radiation beam emitted by a source of finite dimension or of punctiform type, with free propagation, or corrected initially in its vergency and distribution by a reflector or a system which operates according to the phenomena of refraction, diffraction or total inner reflection, strikes an array of micro-filters (pixels) of square or rectangular shape or of arbitrary cross-section. The latter partially or totally transmit the light beam towards a surface with peculiarly reflecting micro-cells. The partially reflected beam comes back towards the first micro-filter matrix and passes again through it until it reaches a viewer or a recording system or a screen. A relative movement between the two matrices thus generates static or animated images or colour bends selectable according to the needs.

The micro-filters or the cells corresponding to different images are two or more for each single micro-mirror present in the micro-mirrors matrix. The size of the coloured micro-filters is such that they partially or totally intercept the converging polychromatic beam. The selection of the colour or the images is obtained by interposing the desired colour in the polychromatic light beam. A relative movement between the micro-filters supporting plate and the micro-mirrors plate or film enables the colour or image to be changed. The cross-section of the film for the type of lenses which are used enables a coloured patterns to be generated with a desired luminous distribution.

Naturally, while the principle of the invention remains the same, the details of construction and the embodiments may widely vary with respect to what has been described and shown purely by way of example, without departing from the scope of the present invention.

What is claimed is:

1. A device for selecting colours or images in a light beam, wherein it comprises:

a light beam generator, an array of micro-lenses acting as micro-filters integrated in a transparent thin plate for generating a plurality of partial beams, an array of micro-mirrors for reflecting a plurality of images, each micro-mirror having a size and a cross-section adapted to the size and the cross-section of each micro-lens, and an actuating device to cause a relative movement between the two arrays of micro-lenses and micro-mirrors so as to obtain an output luminous pattern, selected among various possible patterns which are different in shape and/or colour and/or divergency.

2. Device according to claim 1, in which the arrays of micro-lenses and micro-mirrors are arranged according to a matrix.

3. Device according to claim 1, in which the arrays of micro-lenses and micro-mirrors are arranged according to circles or spirals or in any other combination of these arrangements which enables the output luminous pattern to be selected by a relative movement between micro-lenses and micro-mirrors.

4. Device according to claim 1, in which the micro-mirrors are arranged on a matrix of K×M elements and each micro-mirror has a rectangular cross-section with sides L, H and the micro-filters are in number of N×S for each micro-mirror and have sides L, H, where K, M, N, S are integers.

5. Device for generating static images, wherein it comprises a device according to claim 1, in which the images are selected by varying the relative position between the micro-lenses and the micro-mirrors.

6. Device according to claim 1, wherein for each micro-lens in a matrix of micro-lenses there are a plurality of micro-mirrors of identical or different colour in a micro-mirror matrix.

7. Device according to claim 1, wherein it is provided with means for selecting in sequence images which are slightly different from each other.

8. Device according to claim 1, in which the array of micro-mirrors is used to control the shape, cross-section, divergency and the direction of the light beam, whereas the micro-filters are used to select the colour of the single partial beam.

9. Device according to claim 1, wherein it is used as an integrated part in light systems for motor-vehicles.

10. Signalling device of the portable emergency lamp type, in which a signal is generated by varying the colour of the emitted beam through a device according to claim 1, by a relative movement between micro-filters and micro-lenses.

11. Device according to claim 1, wherein it is used as a traffic light, in which colours, direction signals, fleshing effects are obtained with a single source.

12. Device according to claim 1, wherein it is made in form of traffic sign, in which, beyond the selection of the sign type, also the angular direction of possible viewing can be selected, which is obtained by applying prismatic or diffractive effects to each cell which forms the sign.

13. Device according to claim 1, wherein it is able to generate more angularly separated images by means of micro-mirrors provided with gratings for multiplying the beam.

14. Device according to claim 1, wherein it is used as an advertising panel or luminous sign.

15. Image projector device, wherein it comprises a device according to claim 1, using an objective for focusing on a screen, the multiplicity of images being recorded on the whole dimension of a diapositive forming the array of micro-filters and the selection of the image being obtained by causing a relative movement between the diapositive and the micro-mirrors.

* * * * *